United States Patent Office 3,702,651
Patented Nov. 14, 1972

3,702,651
CLUTCH RELEASING DEVICE
Saburo Fujita, Anjo, Hiroshi Ban, Toyota, and Yukiro Takikawa, Nagoya, Japan, assignors to Aisin Seiki Kabushiki Kaisha, Kariya, Japan
Filed Oct. 22, 1970, Ser. No. 83,035
Claims priority, application Japan, Oct. 25, 1969, 44/101,399
Int. Cl. F16d 13/75
U.S. Cl. 192—70.25    7 Claims

ABSTRACT OF THE DISCLOSURE

A clutch releasing device for a clutch assembly comprising a spring normally urging the clutch disc in the clutch releasing direction, and stopper means for limiting the movement of the clutch disc whereby the clutch disc assembly is rapidly and completely released from the driving members when the clutch is released.

---

This invention relates to clutch assemblies for use on a wheeled vehicle such as an automotive vehicle, and more specifically to clutch assemblies incorporating improved means for positively releasing the clutch disc assembly from the driving member.

It is desirable in clutch assemblies that disengagement of the clutch be accomplished quickly without any drag. However, in conventional clutch assemblies, the clutch disc is adapted to be released from the driving member such as a flywheel only by vibration of the automotive engine and the like. Consequently, the friction facings of a clutch disc assembly are likely to adhere to the driving member when the pressure plate is completely disengaged, said facings being compressed by the flywheel and pressure plate during clutch engagement.

In addition, when the friction facings wear sufficiently, upon clutch engagement they will slip with respect to the driving members whereby minimum rotating force is transmitted to the driven shaft associated with the transmission mechanism of the vehicle and the clutch pedal stroke for completely disengaging the clutch is elongated. In order to improve the above drawbacks, there has been proposed adjusting means for clutch pedal stroke which will adjust the clearance gap between the clutch disc and pressure plate by advancing the latter towards the former depending upon the wear of the friction facings so that the said clearance gap may be compensated. However, the clearance gap between the clutch disc and flywheel is not compensated, so that the clearance gap between the clutch disc and flywheel will become larger than that between the clutch disc and pressure plate. The clutch disc is in turn likely to adhere to the pressure plate upon clutch disengagement. It is, therefore, an object of the invention to provide a clutch releasing device for clutch assemblies which effects a rapid and complete disengagement of clutch disc assembly from associated members.

Another object is to provide a clutch releasing device which will compensate for wear of the friction facings of a clutch disc assembly.

A further object is to provide a clutch releasing device in accordance with the preceding objects which is easy to manufacture.

The clutch releasing device of the invention comprises an inner sleeve normally making contact with the pilot bearing for the transmission drive shaft, an outer sleeve normally making frictional engagement with the clutch disc assembly, and a helical spring provided between the inner and outer sleeves for urging the outer sleeve together with the clutch disc assembly in the clutch releasing direction whereby the clutch disc assembly is forced to be rapidly disengaged at a predetermined distance upon clutch disengagement.

For a better understanding of the present invention and to show how the same may be carried into effect, reference will now be made, by way of example, to the accompanying drawings, in which.

Figure 1:
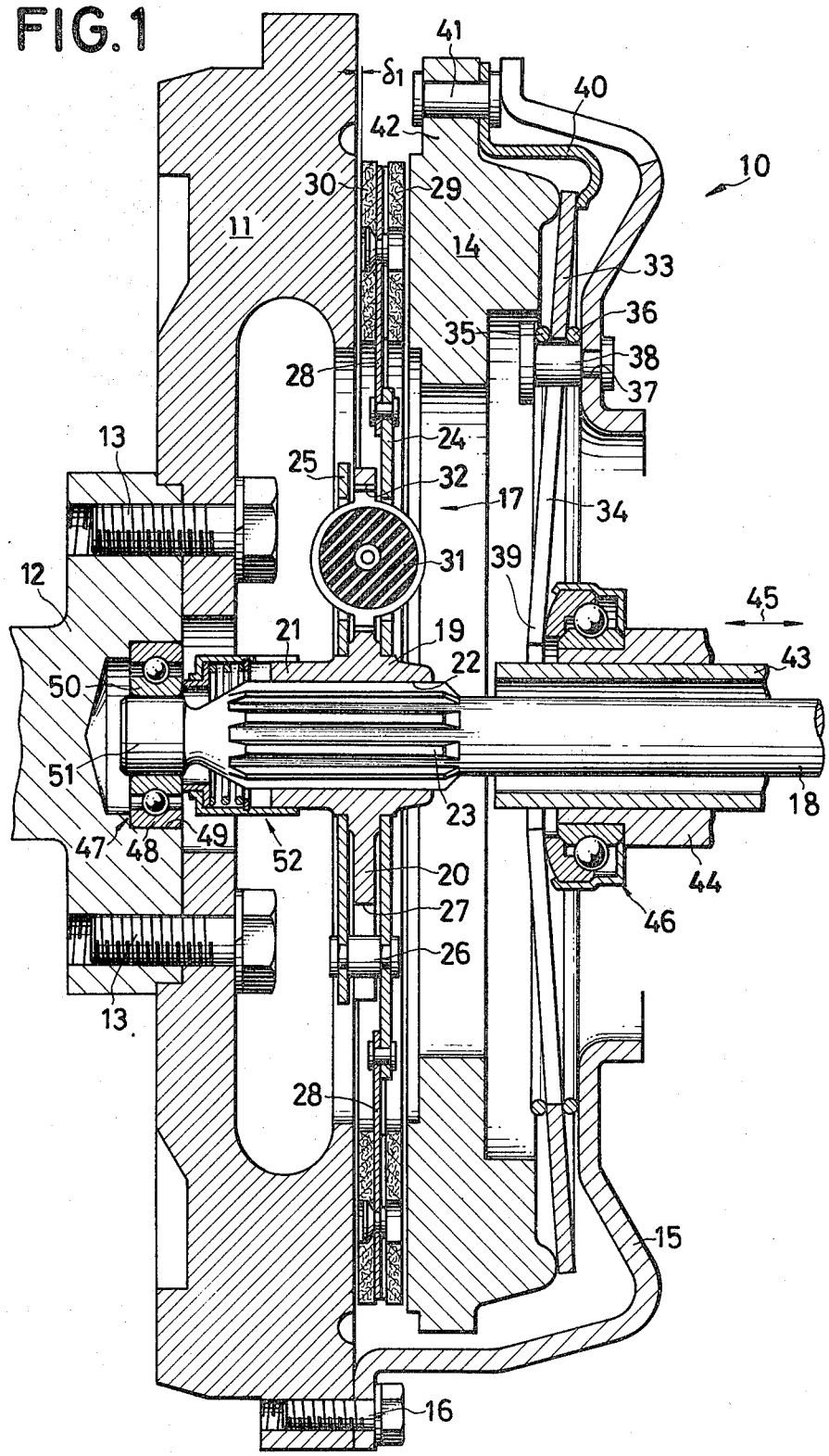
FIG. 1 is a side elevational view in section of a clutch assembly incorporating a clutch releasing device according to this invention, said clutch assembly being shown in its released position.

Referring now to the drawings, the reference character 10 designates generally a clutch assembly to transmit drive from a driving member to a driven member. The clutch assembly 10 comprises a flywheel 11 connected to and rotatably driven by a prime mover (not shown) such as an automotive engine through a drive shaft 12, said drive shaft being fixed to the flywheel 11 by means of screw bolts 13. The assembly 10 also comprises a pressure plate 14 adapted to be actuated in a normal manner and a clutch cover 15 which is attached to the flywheel 11 by bolts 16 so that it may rotate with the flywheel. The assembly 10 further comprises a clutch disc assembly 17 which is slidably mounted on a driven shaft 18.

The clutch disc assembly 17 comprises a hub member 19 having a flange 20 extending radially outwardly therefrom and a sleeve 21 extending axially therefrom, said hub member being provided with a splined bore 22 to cooperate with a spline 23 on the driven shaft whereby the clutch disc assembly is drivingly mounted on the rotatable driven shaft 18 and is adapted for sliding movement longitudinally thereon. An annular clutch plate 24 of the disc assembly 17 is supported on the hub 19 at one side thereof whilst a side washer 25 is supported on the hub at the other side thereof. The plate 24 and the washer 25 are connected together by a plurality of spacer rivets or spools 26 the barrels of which are positioned in recesses or notches 27 extending inwardly from the periphery of hub flange 20, thus the clutch plate and side washer are connected together for simultaneous movement whilst they are maintained in parallel spaced relationship.

The clutch plate 24 is illustrated as carrying a plurality of circumferentially spaced and radially outwardly extending spring cushions 28 riveted to the outer periphery of the plate 24. The spring cushions 28 in turn carry annularly arranged friction facings 29 and 30 on opposite sides thereof adapted to be compressed between the flywheel and pressure plate in a conventional clutching manner. There is an axial gap $\delta_1$ between the flywheel 11 and the friction facing 30.

Torsion damper means 31 are rigidly mounted in openings 32 of the hub flange 20 for providing a flexible or yieldable driving connection between the clutch plate 24 and the hub member 19.

A conventional diaphragm spring 33 having a number of radially and inwardly directed tongues 34 is rigidly connected through the intermediary of pivot rings 35 and 36 with the clutch cover 15 at the zone of its recess 37 by means of rivets 38. When the diaphragm spring 33 is freed of pressure exerted thereupon during assembly, so as to let the diaphragm spring take up its natural configuration, the tongues 34 will deflect their respective innermost free ends 39 towards the right of FIG. 1 from the position shown.

A retracting spring 40 is fixed by means of rivets 41 to an annular shoulder or radial projection 42 formed on the peripheral zone of the pressure plate 14. The retracting spring 40 has a substantially loop-shaped cross-section and is maintained slightly compressed so that the free end of the spring presses against the peripheral zone of the diaphragm spring 33, thereby resiliently urging the latter against the shoulder 42 so that a pressure contact between both is normally maintained.

Concentrically with the driven shaft 18, there is provided a stationary tube shaft 43 which is mounted rigidly on the conventional chassis (not shown) of the vehicle. On the tube shaft 43, a slide 44 is slidably mounted so as to move to and fro, as indicated by a double-headed arrow 45, and rigidly mounts in turn conventional release bearing means 46 which are connected with a clutch pedal (not shown) fitted commonly in the vehicle at the operator's seat for being controlled at the will of the operator.

A pilot bearing 47 is rigidly fitted at its outer race 48 in an inner periphery 49 of the drive shaft 12. An inner race 50 of the bearing mounts an extreme end 51 of the driven shaft 18.

Figure 2:
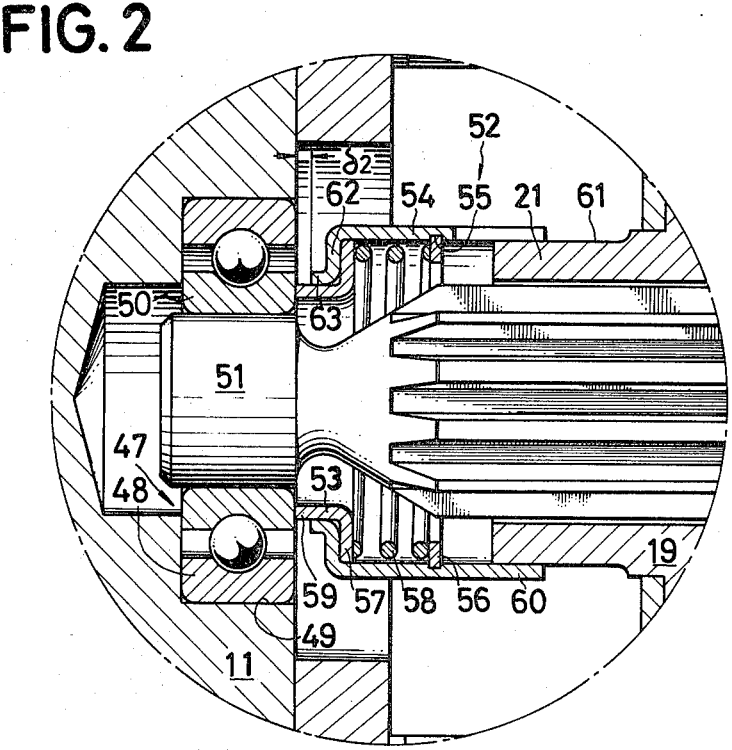
FIG. 2 is an enlarged view of the clutch releasing device of FIG. 1.

A clutch releasing device is generally indicated by numeral 52. The clutch releasing device 52 comprises a first inner sleeve 53 concentric with the driven shaft 18, and a second outer member or sleeve 54 also concentric therewith. The outer sleeve 54 formed into tubular shape is provided at its inner periphery with an inner groove 55 in which a snap ring 56 is securely fitted. Between the snap ring 56 and a flange 57 of the inner sleeve 53, a helical spring 58 is provided thereby normally causing the inner sleeve to make contact with the inner race 50 of the pilot bearing 47 at its end portion 59. The outer member or sleeve 54 also comprises a plurality of axially extending slitted flanges or tongues 60 which are adapted for frictional engagement with the outer periphery 61 of the sleeve 21 of the hub member 19, a head portion or flange 62 makes contact with the flange 57 of the inner sleeve 53 by the force of the helical spring 58 when the clutch is released, as is shown in FIG. 2, and an end portion 63 is axially spaced at a distance $\delta_2$ from the pilot bearing 47 as is shown in FIG. 2. The distance of $\delta_2$ is substantially equal to $\delta_1$.

Thus it will be seen that the sleeves 53 and 54 together with the flanges 57 and 62 serve as stopper means for limiting clutch releasing movement of said disc assembly.

It should be noted that the force exerted by the helical spring is smaller than the frictional gripping force of the flanges 60 of the outer sleeve on the outer periphery 61 of the hub, so that when the clutch is engaged the outer sleeve 54 is urged axially together with the clutch hub member 19 until the end portion 63 of the outer sleeve makes contact with the inner race 50 of the pilot bearing 47, that is to say, over the distance $\delta_2$. As a result, the flange 62 of outer sleeve 54 and the flange 57 of inner sleeve 53, are spaced a distance $\delta_3$ equal to $\delta_2$.

In operation, if it is assumed that the automotive engine is running, motion is transmitted therefrom through the flywheel 11 to clutch disc assembly 17, thence through torsion damper 31, clutch hub 19, and spline coupling 23 to the driven shaft 18.

Figure 3:
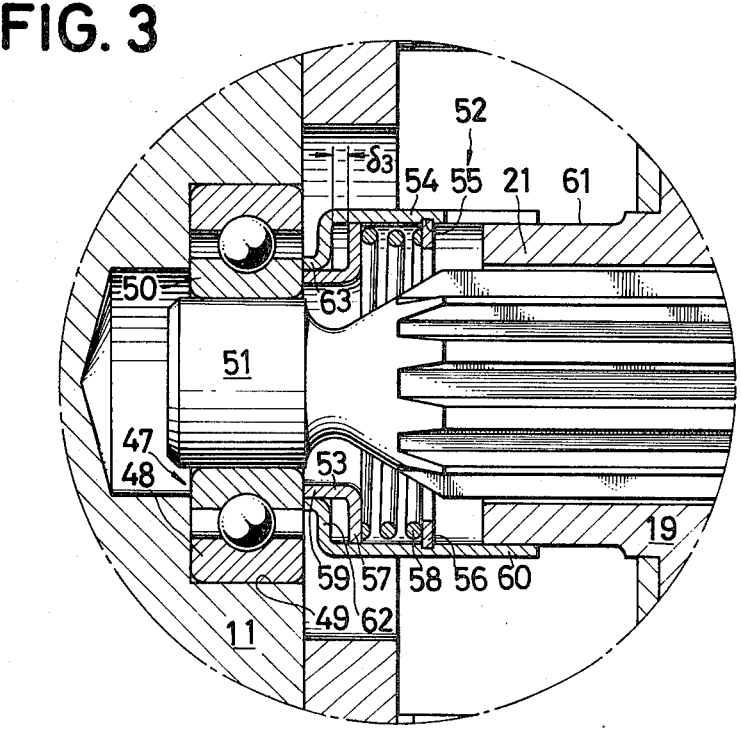
FIG. 3 is a view similar to FIG. 2, but showing the device in its clutch engaging position.

Rotation is similarly transmitted from flywheel 11 to the clutch cover 15, thence through fixing rivets 38 and diaphragm spring 33 to the pressure plate 14 which is therefore kept in rotation at the same speed as that of the rotating flywheel 11. In this condition the clutch disc assembly 17 has been shifted to the left from the position shown in FIG. 1 due to the pressure plate 14, causing the outer sleeve 54 to shift to the left against the force of the helical spring 58. Thus the gap $\delta_3$ is maintained between the flange 57 of inner sleeve 53 and the flange 62 of outer sleeve 54 as is seen in FIG. 3.

Then, when it is desired to disengage the clutch from the engine, the operator must depress the clutch pedal (not shown) so as to advance the slide 44, together with release bearing 46, along tube shaft 43, until the bearing 46 is brought into contact with the tips 39 of the tongues 34 of the diaphragm spring 33.

As further pressure is exerted upon the clutch pedal the release bearing 46 is further advanced in the left direction in FIG. 1, and thus a further force is applied to the tongue tips 39 which are thereby shifted a small distance towards the left of FIG. 1 until the tongues 34 suddenly deflect further to the left of FIG. 1 as the diaphragm action of the spring 33 occurs. The spring 33 is forced to pivot in the clockwise direction in FIG. 1 about the pivot rings 35 and 36 and pressure is therefore transmitted by the diaphragm spring through the retracting spring 40 and rivets 41 to the pressure plate 14 which is thus moved axially in the right direction when seen in FIG. 1. Simultaneously, the outer sleeve 54 is, together with the hub member 19, urged to move in the right direction by the force of the spring 58 until the flange 57 of inner sleeve 53 is engaged with the flange 62 of outer sleeve 54, that is to say, a distance of $\delta_3$. Thus, the clutch disc assembly is forced to rapidly move in the clutch releasing direction so as to keep the axial gap $\delta_1$ between the facing 30 and the flywheel 11.

When it is desired to re-engage the clutch the operator releases the clutch pedal whereupon the diaphragm spring 33 pivots back anti-clockwise with reference to FIG. 1 under its own spring action, and the pressure plate 14 is thus urged towards the left of FIG. 1.

It should be recognized that the clutch releasing device 52 functions as wear-compensating means for the friction facings. When the facings have been worn, upon clutch engagement, the outer sleeve 54 has made contact at its end portion 63 with the inner race 50 of pilot bearing 47 and the sleeve 21 is urged to move further towards the left of FIG. 3 before the facing 30 is brought into engagement with flywheel since the axial gap of $\delta_1$ is larger than that of $\delta_2$. Thus, the sleeve 21 of the clutch hub 19 will slide in the slitted flanges 60 of sleeve 54 towards the left from the position shown in FIG. 3 since the frictional gripping force of the flanges 60 on the outer peripheral portion 61 of hub sleeve 21 is smaller than the axially sliding force of the clutch hub 19 due to the pressure plate 14. Thus suitable adjustment is made and the wear on the facing 30 is readily compensated for so that the axial gap $\delta_1$ is normally maintained. It will be seen that the force of the helical spring 58 is not changed and the force thereof will apply on the clutch hub 19.

Figure 4:
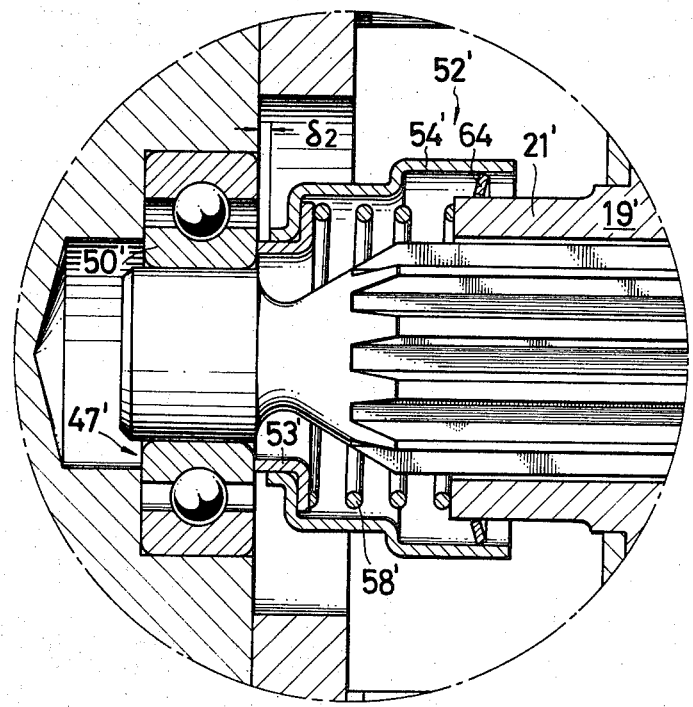
FIGS. 4 and 5 are enlarged views of modification of the clutch releasing device, showing clutch releasing and engaging positions respectively.
Figure 5:
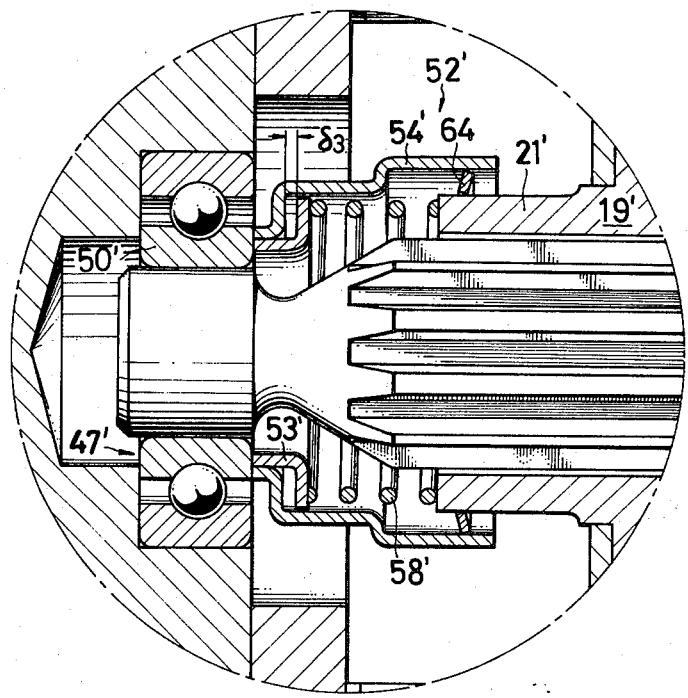

Referring to FIGS. 4 and 5, there is shown a modification with the same structure as shown in the previous embodiment being designated with the same reference numerals with primes (') affixed thereto. The main difference from the foregoing embodiment resides in the frictional engagement between the hub sleeve 19' and the outer sleeve 54' of the clutch releasing device.

The outer sleeve 54' of the clutch releasing device 52' is held on the hub sleeve 21' through the intermediary of a "Belleville" type spring washer 64 which acts as a one-way stopper due to its configuration. When the outer sleeve 54' is urged to move towards the right in FIG. 5 (in the clutch releasing direction) the washer 64 permits the said movement, while when the outer sleeve is urged to move towards the left (in the clutch engaging direction) the washer 64 will prevent the said movement due to its wedging function.

During clutch engagement, the outer sleeve 54' makes contact with the inner race 50' of the pilot bearing 47' and the helical spring 58' is compressed due to advancement of the clutch hub 19', so that the axial gap $\delta_3$ is maintained between the outer sleeve 54' and inner sleeve 53' as is illustrated in FIG. 5.

Upon clutch disengagement, the cluch hub 19' is moved together with the outer sleeve 54' towards the right by the force of the helical springs 58' a distance of $\delta_3$, further axial movement thereof being prevented by said stopper washer 64 and the inner sleeve 53' which contacts the outer sleeve 54′ as is illustrated in FIG. 4. Thus the axial gap $\delta_2$ is readily maintained between the outer sleeve 54′ and the pilot bearing 47′, that is to say, the axial gap equal to $\delta_2$ is readily maintained between the friction facing and flywheel.

When the friction facing wears, upon clutch engagement, the clutch hub 19′ will frictionally slide towards the left of FIG. 5 against the force of the Belleville spring 64 and the force of helical spring 58′ after the outer sleeve 54′ has made contact with the pilot bearing 47′. When the clutch is released, the clutch hub 19′ is forced to move in the clutch releasing direction a distance $\delta_3$ by the helical spring 58′, so that the constant axial gap is retained between the clutch disc assembly and flywheel. In this manner adjustment is made.

What is claimed is:

1. In a clutch assembly having a disc assembly including a hub member, friction facings disposed about the periphery of said disc assembly, a shaft driven by said disc assembly, a flywheel, a pressure plate connected to said flywheel, a pilot bearing for one end of said driven shaft, the improvement which comprises a clutch releasing device including, a spring mounted between said pilot bearing and said hub member for normally urging said disc assembly to move in the clutch releasing direction, stopper means for defining the most released position of said disc assembly and including a first member concentric with said driven shaft and provided with a first flange, a second member concentric with said first member and provided with a second flange, said second member being frictionally engaged with said hub member, said first member being mounted to be immovable in an axial direction relative to the driven shaft whereby said second flange engages said first flange so that the clutch releasing movement of said disc assembly is limited to a predetermined distance.

2. A clutch assembly as claimed in claim 1 and further comprising adjustment means for permitting said second member to slide axially of said hub member when moving in the clutch engaging direction to compensate for wear of said friction facings.

3. A clutch assembly as claimed in claim 2 wherein said adjustment means comprises a plurality of tongues at the inner end of said second member for frictionally engaging said hub member.

4. A clutch assembly as claimed in claim 2 and further comprising a Belleville spring disposed between said second member and said hub member.

5. A clutch assembly as claimed in claim 1 wherein said spring exerts a force less than the force of the frictional engagement between said second member and said hub member.

6. A clutch assembly as claimed in claim 1 wherein said first and second members have tubular shapes.

7. A clutch assembly as claimed in claim 1 and further comprising a snap ring secured to the inner surface of said second member for receiving one end of said spring.

References Cited
UNITED STATES PATENTS

| | | | |
|---|---|---|---|
| 1,438,457 | 12/1922 | Morton | 192—70.28 X |
| 2,020,637 | 11/1935 | Fawick | 192—89 B X |
| 3,391,768 | 7/1968 | Fixari | 192—111 A |
| 3,394,787 | 7/1968 | Fitzgerald | 192—111 A X |
| 3,485,330 | 12/1969 | Reiff | 192—111 A X |

ALLAN D. HERRMANN, Primary Examiner

U.S. Cl. X.R.

192—70.28, 111 A